May 13, 1941.  H. RENSCH  2,241,922
RADIO DIRECTION FINDING SYSTEM
Filed July 15, 1939

Inventor:
Heinz Rensch
by R. C. Hopgood
Attorney.

Patented May 13, 1941

2,241,922

UNITED STATES PATENT OFFICE 2,241,922

RADIO DIRECTION FINDING SYSTEM

Heinz Rensch, Berlin, Germany, assignor to C. Lorenz Aktiengesellschaft, Berlin-Tempelhof, Germany, a company Application July 15, 1939, Serial No. 284,572
In Germany July 20, 1938

3 Claims. (Cl. 250—11)

This invention relates to radio direction finding receivers, and more particularly to new and useful means applicable to the input circuit thereof for improving the accuracy of operation of such systems.

Radio direction finders utilizing the minimum effect of an antenna for indicating the direction of a radio transmitter generally comprise, in addition to a directional antenna or antenna system in cooperation with a radio goniometer, a non-directional auxiliary antenna which is indictively coupled with the input circuit of the receiver, that is, to a tuning circuit forming part of the grid circuit of the first amplifying tube thereof. The circuit of this auxiliary antenna is provided with means for regulating the voltage thereof with respect to amplitude and/or phase, in order to more sharply define the minimum effect of the loop antenna which has a vanishing tendency due to the natural asymmetry of loop antennas.

An object of this invention is to provide means in radio receivers of the above mentioned type which in a simple manner avoid the misleading errors heretofore caused by the lack of coincidence between the angular position of a loop antenna and the actual direction of incoming waves.

According to the present invention, a radio direction finder, in addition to the inductive coupling heretofore used between a non-directional auxiliary antenna and the input circuit of the finder, is provided with an additional capacitive coupling adapted to transmit a compensating voltage to the input circuit of the receiver in order to equalize interferences occasioned therein due to the fact that the minimum effect of a loop antenna, instead of being exactly perpendicular to the plane of the antenna, is displaced thereto by a certain angular amount either to the left or the right.

Figure 1:
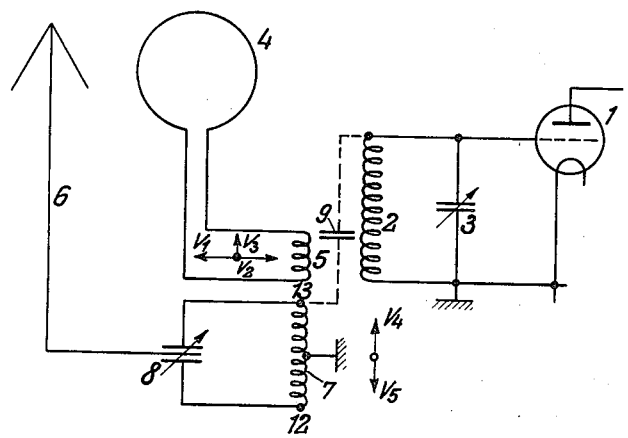
Figure 3:
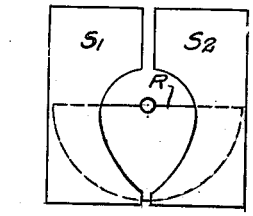
Figure 2:
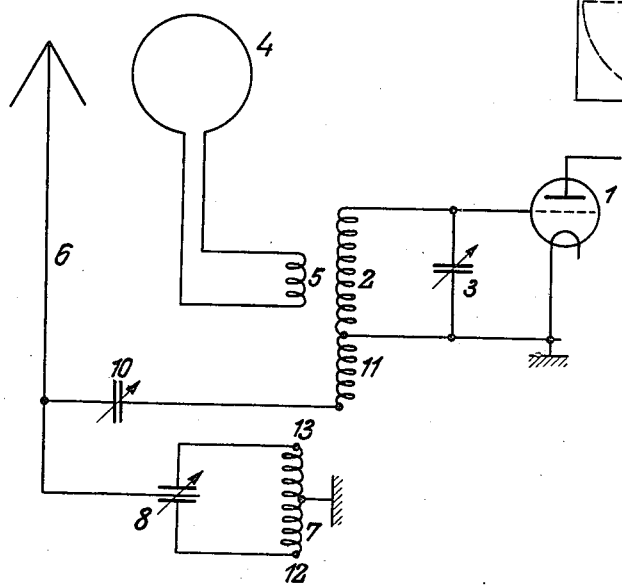

The occurrence of this angular error and its compensation by the measures proposed according to this invention will hereinafter be clearly explained in conjunction with the accompanying drawing, in which Fig. 1 is a diagrammatic showing of a conventional input circuit of a radio direction finder, while Fig. 2 diagrammatically shows an arrangement according to this invention. Fig. 3 illustrates a particular preferred form of differential condenser for use with my invention.

Referring to Fig. 1, reference numeral 1 denotes an input tube of a radio direction finding receiver having an oscillatory circuit formed by an inductance coil 2 and a variable condenser 3 connected across its grid circuit. A directional or loop antenna 4 is coupled to this oscillatory circuit through a coupling coil 5. For the purpose of more sharply defining the minimum effect of the loop antenna 4, a non-directional auxiliary antenna 6 is provided and inductively coupled with the input circuit 2, 3 through a further coupling coil 7. In addition to the coil 7, the circuit of the auxiliary antenna 6 comprises a differential condenser 8 shunted across the coil 7 and having for its object to adjust the potential of this antenna with respect to amplitude and phase. The mid-point of the coil 7, therefore, is connected to ground.

The voltage conditions at the input circuit of the receiver will hereinafter be more closely discussed with reference to Fig. 1 and the vectors shown therein. The vectors V1 and V2 indicate the voltages which are set up in the loop antenna 4. The amplitudes of these voltages depend upon the angular position of the loop relative to the direction in which a transmitter is located, so that their variations are determined by the directional effect of the loop. When the plane of the loop antenna passes through the minimum position, the phase is caused to make a change of 180 degrees, so that according to the momentary angular position of the loop, either the vector V1 or the vector V2 is rendered effective. As a matter of fact, the frame or loop antenna does unfortunately not only deliver the voltages V1 and V2, respectively, in response to the directional effect of the loop, but likewise, due to its natural asymmetry, a non-directional voltage represented by the vector V3 in Fig. 1 perpendicularly related to the vectors V1 and V2. This non-directional component produces a blanketing tendency upon the minima of the loop with the result that the sharpness of the directional effect becomes reduced. It has been proposed in the past to overcome this deleterious effect by means of the non-directional auxiliary antenna 6, and to so adjust the voltage thereof by a differential condenser 8 that this voltage may be caused to influence the input circuit 2, 3 of the tube 1 either in the sense of the vector V4 or of the vector V5 in response to the relative position of the differential condenser 8 subject to such adjustment that voltages of the auxiliary antenna are of equal amplitude but in phase opposition with respect to the above mentioned non-directional component of the loop.

The heretofore discussed conditions and operation relate to radio direction finding systems known in the art. Now, experience teaches that the inductive coupling between the auxiliary antenna and the input circuit 2, 3 of the receiver gives rise to an additional harmful effect which to a certain extent displaces the minima of the frame from their normal positions. This effect is due to the fact that the inductance 7 of the auxiliary antenna 6 and the inductance 2 forming part of the input circuit of the tube 1 are not only inductively coupled with one another, but that an additional capacitive coupling occurs between these two inductance coils. This additional capacitive coupling is indicated in the Fig. 1 by the capacity 9. The grid of the tube 1 thus acquires a harmful voltage, the magnitude of which depends upon the ratio of the capacitive impedance 9 to the impedance of the input circuit 2, 3, that is, the voltage distributing effect. This harmful voltage may be decomposed in two vertical components which are mutually displaced with respect to one another by 180 degrees. One of these components is cophasal with the voltage V3, while the phase of the other component coincides with the voltage V1 or the voltage V2 of the loop 4. The first mentioned spurious component involves no deleterious effect since this component is included in the action for more sharply defining the minimum effect of the frame or loop. However, the voltage component in phase coincidence with or in phase opposition to the voltage of the loop involves the harmful effect that the loop must be turned away from its zero or minimum position until the potential of the frame and the first mentioned voltage compensate each other. The result of this compensating action is that the minimum of the loop becomes shifted either to the right or to the left by a certain angle of fault.

This harmful effect may be avoided according to my invention by designing the input circuit of a radio direction finder as shown in Fig. 2. The circuit arrangement shown in this figure principally corresponds to that of Fig. 1 with the exception that an additional capacitive coupling has been provided between the auxiliary antenna 6 and the input circuit 2, 3 of the receiver. The means forming this capacitive coupling are a neutralization condenser 10 and an inductance coil 11. These two means constitute a path over which a compensation voltage is conveyed from the auxiliary antenna 6 to the input circuit of the tube 1. This compensation voltage opposes the spurious capacitive component which is set up between the inductances 7 and 2 and the amplitude of this voltage may be made equal in magnitude as compared with that of the spurious capacitive component by suitably adjusting the neutralization condenser 10. If this condenser is given a correct adjustment, the harmful capacitive effect between the inductances 7 and 2 becomes nullified and the above mentioned angular error eliminated.

This harmful effect may be removed by one single definite adjustment of the neutralization condenser 10 since the spurious capacity between the inductances 7 and 2 is constant, that is, introduces an error of constancy. Nevertheless, in cases that the plates or vanes of the differential condenser 8 present unsuitable configurations, the effective capacity between the terminals 12 and 13 of the inductance coil 7 may be subjected to a change or changes when the rotor plate of this condenser is moved relative to the stator plates thereof in order to regulate the voltage of the auxiliary antenna 6. Such capacity change is transferred to the grid circuit 2, 3 which becomes detuned during the regulation of the auxiliary antenna voltage. Moreover, also the ratio of the voltage distributing effect of the capacity 9 to the impedance of the input circuit 2, 3 is affected by the aforementioned capacitive change. Such detuning of the input circuit 2, 3 involves a harmful effect since the capacitive spurious component is caused to vary as soon as the voltage of the auxiliary antenna becomes subject to regulation, so that the neutralization attained by the condenser 10 does not apply to each and every angular position of the rotor plate relative to the stator plates, that is, a variable error is introduced.

This disadvantage is overcome in accordance with a further feature of this invention by using in the position of the condenser 8 of the circuit arrangement according to Fig. 2 a differential condenser, the rotor and stator plates of which are so dimensioned that the capacity effective between the terminals 12 and 13 of the inductance 7 remains constant independent of the relative position of the rotor plate to the stator plates. A differential condenser involving this property is disclosed in the copending U. S. application Ser. No. 277,784 filed June 7, 1939, in the name of Hans Berthold with assignment to C. Lorenz Aktiengesellschaft of Berlin-Tempelhof (Germany) and is diagrammatically shown in Fig. 3. Stator plates $S_1$ and $S_2$ are provided in cooperation with a semi-circular rotor plate R. The plates are so proportioned that the total capacity does not vary when variation of the differential capacities occurs. The complete theory of this system does not constitute a feature of this invention and so is not fully explained herein. However, a complete explanation may be found in the above-mentioned copending application. In cases that a differential condenser of this type is employed, a detuning of the input circuit 2, 3 is prevented, so that the harmful component may be satisfactorily compensated once for all by one single adjustment of the neutralization condenser 10.

What is claimed is:

1. In a radio direction finding system, a signal input circuit having an inductance and a capacity forming an input oscillatory circuit, a directional antenna system inductively coupled to said inductance, a non-directional auxiliary antenna, means including a coupling coil and a differential condenser for coupling the said non-directional auxiliary antenna to the said oscillatory circuit whereby a spurious voltage is produced between said coupling means and said oscillatory circuit, and additional capacitive coupling means disposed between the said auxiliary antenna and the said inductance to produce a voltage of equal magnitude but of opposite phase with respect to said spurious voltage for compensating the said spurious voltage.

2. The invention according to claim 1, characterized in that a further inductance coil is operatively associated with said input oscillatory circuit, and the said additional capacitive coupling means comprises a variable neutralization condenser connected in series with said further inductance coil.

3. A radio direction finding system as set forth in claim 1, in which the said means for inductively coupling the said non-directional auxiliary antenna to the said oscillatory circuit comprise a differential condenser having two stator plates and one rotatable plate connected to the said auxiliary antenna, and an inductance coil having two outer terminals each electrically connected to one of the said stator plates for adjusting the voltage of the said auxiliary antenna with respect to amplitude and phase, the configuration of the said differential condenser plates being defined in accordance with a predetermined law for rendering the capacity between the said two terminals independent of a movement of the said rotor plate relative to the said stator plates.

HEINZ RENSCH.